(No Model.)

E. F. SMITH.
LINK SHIFTING MECHANISM FOR ENGINES.

No. 535,603. Patented Mar. 12, 1895.

WITNESSES.
A. L. Jackson
F. Einfeldt

INVENTOR
Edward F. Smith
By J. H. Sturgeon
Atty.

UNITED STATES PATENT OFFICE.

EDWARD F. SMITH, OF TITUSVILLE, PENNSYLVANIA.

LINK-SHIFTING MECHANISM FOR ENGINES.

SPECIFICATION forming part of Letters Patent No. 535,603, dated March 12, 1895.

Application filed May 25, 1894. Serial No. 512,471. (No model.)

*To all whom it may concern:*

Be it known that I, EDWARD F. SMITH, a citizen of the United States, residing at Titusville, in the county of Crawford and State of Pennsylvania, have invented certain new and useful Improvements in Link-Shifting Mechanism for Steam-Engines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in link shifting mechanism for steam engines, hereinafter set forth and explained and illustrated in the accompanying drawings, in which—

Figure 1:
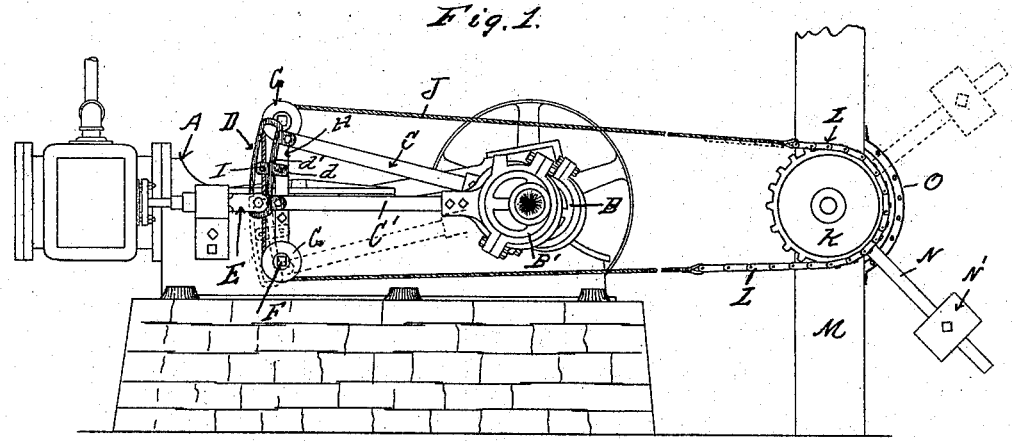
Figure 2:
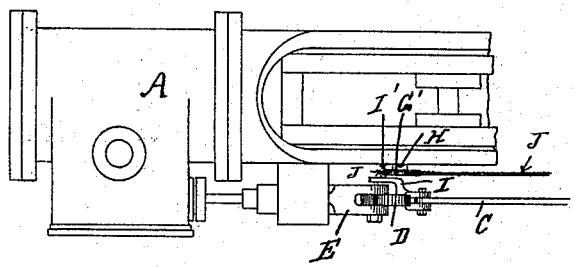

Figure 1 is a side elevation of a steam engine embodying my improved link shifting mechanism. Fig. 2 is a top or plan view of a portion of a steam engine embodying a portion of my improved link shifting mechanism.

The object of my invention is to construct a convenient link shifting mechanism for steam engines, by means of which the link of a steam engine can be conveniently operated at a distance from the engine, so as to reverse the engine, or stop it by moving the link until its center operates on the valve stem.

In the construction of my invention illustrated in the accompanying drawings, A is a steam engine, provided with eccentrics B B', eccentric rods C C', a link D connected thereto, and a valve stem E upon which the link operates in the usual manner, all of which are of ordinary construction.

Upon a stud pin F on the frame of the engine A at a point thereon a little below the point of traverse of the center of the link D, I pivot a grooved sheave G in such position that the link D will pass down outside of it, and on an arm H secured to and projecting upward from the engine frame, I pivot a second sheave G' directly above and in line vertically with the sheave G, and to a projection *d* on the center of the part *d'* of the link D, I secure an arm I, which curves backward and forward behind the link D to a point coincident, vertically and horizontally, with the center of the opening in the link D. To an eye I' secured to the side of the end of the arm I is secured, preferably, a wire rope J which passes over and around the sheaves G and G' to a sprocket wheel K where the rope J is secured to a section of sprocket chain L which passes around the sprocket wheel K, pivoted to a suitable support M and is again secured to the other end of the rope J, so that the rope J and chain K form an endless belt around the sheaves G G' and the sprocket wheel K. This sprocket wheel K may be placed at any convenient point, either in direct line with the sheaves G and G' or carried off to one side by means of ordinary guide sheaves (not shown) as may be desired.

To the sprocket wheel K is secured an operating lever N, preferably provided with an adjustable weight N' adapted to counterbalance the weight of the link D and eccentric rods C and C', so that it will remain in any desired position. A stop mechanism O is however preferably provided by means whereof the lever N may be secured in any position desired.

The operation of the mechanism hereinbefore described is so obvious that further description thereof is believed to be unnecessary. Therefore, Having described my invention, so as to enable others to construct and use the same, what I claim as new, and desire to secure by Letters Patent of the United States, is—

1. The combination with a steam engine valve link, of sheaves on the engine frame, a rope or belt secured to said link, and operating around said sheaves and means for simultaneously operating both ropes, substantially as and for the purpose set forth.

2. The combination with a steam engine valve, of a sheave pivoted to the engine frame below the end of the valve stem and at the rear of the link, a sheave pivoted to an arm extending upwardly from the engine frame and directly above the lower sheave, a rope or chain belt secured to an arm at the center of the link, and operating as a continuous belt around said sheaves, substantially as and for the purpose set forth.

3. The combination of a steam engine valve link, an endless belt a portion of which is chain, secured centrally thereto, sheaves on the engine frame, and a sprocket wheel or sheave at some distance from the engine, around which the chain portion belt operates, substantially as and for the purpose set forth.

4. The combination of a steam engine valve link D, and endless rope and chain belt J, L, secured to an arm I thereon, sheaves G and G' on the engine frame, and a sprocket wheel K around which said rope and chain belt operates, an operating lever N on said sprocket wheel K, and a counterbalance weight N' thereon, substantially as and for the purpose set forth.

In testimony whereof I affix my signature in presence of two witnesses.

EDWARD F. SMITH.

Witnesses:
F. EINFELDT,
H. J. CURTZE.